United States Patent Office 3,005,003
Patented Oct. 17, 1961

---

3,005,003
MANUFACTURE OF ORGANIC PHOSPHORUS COMPOUNDS
Arthur Henry Ford-Moore, Salisbury, England, and Geoffrey William Wood, Cambridge, Mass., assignors to Minister of Supply, London, England
No Drawing. Filed Mar. 31, 1955, Ser. No. 498,442
2 Claims. (Cl. 260—461)

This invention relates to the manufacture of organic phosphorus compounds and is particularly concerned with the manufacture of organic compounds which are derivatives of phosphoric acid containing sulphur and are now generally classified as phosphorothiolate esters.

Some compounds of this class are known and have valuable insecticidal properties, while some other possess high toxicity.

Some organic compounds of phosphorus which are ester derivatives of phosphoric acid which contain sulphur are known as phosphorothionates. They contain the molecular structure indicated by the formula:

(1)

where R and R$_1$ are organic radicals. The phosphorothiolates are corresponding isomeric compounds which contain the molecular structure indicated by the formula:

(2)

It has now been found that a convenient method of producing organic phosphorothiolates in a state of substantial purity is to make an organic phosphorothionate and then to isomerise the latter to obtain the desired isomeric product.

The present invention consists in a process for the manufacture of organic phosphorothiolates, which comprises first the conversion of a simple trialkyl phosphite by transesterification with a selected aliphatic alcohol to produce a mixed trialkayl phosphite ester containing a selected ester alkyl group (which may be a substituted alkyl group), then the mixed trialkyl phosphite ester produced is separated and reacted with elemental sulphur to produce a trialkyl phosphorothionate containing the said selected ester alkyl group and finally the trialkyl phosphorothionate is isomerised to produce the corresponding trialkyl phosphorothiolate.

The transesterification step is preferably carried out with the aid of a catalyst. For this purpose, when one of the starting materials is for example triethyl phosphite, the catalyst used may be a small proportion of the corresponding acid phosphite, for example from 0.5 to 1.0 percent by weight.

The second step in the process which is the reaction of the trialkyl phosphite ester with sulphur may be carried out at normal temperature and pressure.

The third step in the process which is the isomerisation step may be effected by heating the trialkyl phosphorothionate to an elevated temperature, for example, to about 130° C. for a few hours preferably in the presence of a catalyst, for example 0.5 percent of an alkali metal alcoholate of the alcohol used in the transesterification step of the process.

In order that the invention may be readily understood the process will be described in outline by way of example as applied to the production of diethyl 2-ethylthioethyl-phosphorothiolate:

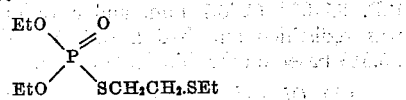

The first stage in the process is the preparation of the appropriate mixed phosphite by the catalyzed transesterification of a simple trialkyl phosphite, namely triethyl-phosphite with the required alcohol containing a selected alkyl group, in this case 2-ethylthioethanol. The mixture is heated at 150° C. for about two hours in the presence of a small quantity of diethyl hydrogen phosphite, for instance from 0.5 to 1.0 percent by weight, which acts as catalyst. The product is a mixture of ethanol and diethyl O-ethylthioethyl phosphite. The reaction which occurs is represented by the following equation:

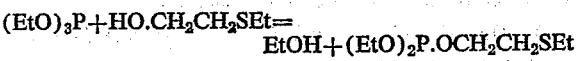
$$(EtO)_3P + HO.CH_2CH_2SEt = EtOH + (EtO)_2P.OCH_2CH_2SEt$$

The ethanol is removed by distillation and the residual mixed trialkyl phosphite ester is reacted with powdered sulphur at ordinary room temperature and atmospheric pressure in a flask fitted with a condenser. This additive reaction which is the second stage of the process is represented as follows:

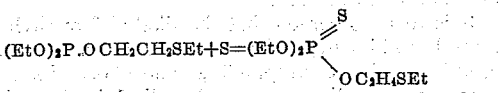

The product of this reaction is diethyl 2-ethylthioethyl phosphorothionate.

The phosphorothionates possess a tendency to isomerize to phosphorothiolates. In accordance with one feature of the present invention this tendency is accelerated with the aid of a catalyst. Thus in the third stage of the present process the diethyl 2-ethylthioethyl phosphorothionate is heated to a temperature of about 130° C. for a few hours, say five hours in the presence of about 0.5 percent by weight of the sodium derivative of the alcohol used in the first stage of the process, that is to say sodium 2-ethylthiothanolate, NaOCH$_2$CH$_2$SEt, which acts as a catalyst. During this heating the phosphorothionate is isomerised almost completely to the corresponding phosphorothiolate, the composition of which is indicated by the following formula:

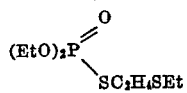

Under favourable conditions the yield may be 95 percent of the required phosphorothiolate, based on the phosphite ester (EtO)$_2$P.OCH$_2$CH$_2$SEt.

The process according to the invention is illustrated by the following specific example which comprises three steps, namely, (1) The catalyzed transesterification of triethyl phosphite to produce the mixed phosphite, diethyl 2-ethylthioethyl phosphite.

(2) The additions of elemental sulphur to produce the required phosporothionate, and (3) The catalytic isomerization of the phosphorothionate to the phosphorothiolate.

EXAMPLES (1) *Diethyl 2-ethylthioethyl phosphite*

Triethyl phosphite (41.5 g.: 0.25 mole), ethylthioethanol (26.5 g.; 0.25 mole), and diethyl hydrogen phosphite (0.3 cc.) were heated in a flask with a short column attached to a downward condenser, to 145–150° C., in an oil bath in a slow stream of nitrogen. The distillation of ethanol (10 cc.) seemed complete in one hour, but the reaction mixture was heated for a further hour. On fractionation under reduced pressure, two low boiling fractions, consisting mainly of triethyl phosphite and of ethylthioethanol were obtained followed by the product B.P. 85–87° C./0.7 mm. and a residue. The product was redistilled and had a B.P. 85° C./0.6 mm. yield 56.5% based on the thioalcohol used.

(2) *Diethyl 2-ethylthioethyl phosphorothionate*

Diethyl 2-ethylthioethyl phosphite (45.5 g.) was treated with sulphur flowers (6.4 g.) added over about one-half hour. Heat was developed and most of the sulphur went into solution. After standing for one hour at 0° C., the material was filtered from a little unreacted sulphur. The yield was practically theoretical. The product boiled at 85–86° C./0.002 mm. but the refracture index of the higher fractions (B.P. 86–87° C./0.0005 mm.) indicated that some isomerisation had taken place. The infra-red absorption spectrum of the undistilled material showed it to be free from phosphorothiolate isomer.

(3) *O,O-diethyl S-2-ethylthioethyl phosphorothiolate*

Diethyl 2-ethylthioethyl phosphorothionate (15 g.; $n_D^{25}$ 1.484) was heated with sodium ethylthioethoxide (0.1 g.) for 5 hours to 130° C. approx. At the end of this time the product after cooling had a refraction index of 1.4935. Its infra-red absorption spectrum showed that a 95 percent conversion to diethyl S-2-ethylthioethyl phosphorothiolate had occurred.

It is to be observed that the diethyl 2-methylthioethyl phosphorothionate, so far as is known, is not readily isomerised to the corresponding phosphorothiolate. The presence of a discrete methyl radical in the substituted alkyl group, that is to say, in the 2-methylthioethyl group appears to inhibit the isomerisation.

Accordingly, the following claims are to be construed so as to exclude the phosphorothionates which contain a discrete methyl substituent as hereinbefore specified.

The invention is not restricted to the production of neutral aliphatic esters of phosphorothiolic acids in which one ester group is substituted by an aliphatic-mercapto group as hereinbefore described, but the process of the invention may also be used for the production of other such phosphorothiolates in which one ester group contains a substituent organic radical other than an aliphatic-mercapto group.

We claim:

1. Process for producing a lower alkyl phosphorothiolate which comprises transesterifying a lower trialkyl phosphite with an alkyl thioalkanol having lower alkyl groups in the presence of a dialkyl hydrogen phosphite catalyst at a temperature of about 145 to 150° C., reacting the resulting lower trialkyl phosphite ester with elemental sulfur to produce the lower trialkyl phosphorothionate, isomerizing the latter in the presence of an alkali metal alcoholate at about 130° C. to form the lower trialkyl phosphorothiolate.

2. Process for producing diethyl S-2-ethylthioethyl phosphorothiolate which comprises transesterifying triethyl phosphite with ethylthioethanol in the presence of diethyl hydrogen phosphite as catalyst at about 145 to 150° C. to produce diethyl 2-ethylthioethyl phosphite, reacting the latter with elemental sulfur to produce diethyl 2-ethylthioethyl phosphorothionate and isomerizing the latter in the presence of sodium ethylthioethoxide at about 130° C. to produce diethyl S-2-ethylthioethyl phosphorothiolate.

References Cited in the file of this patent

UNITED STATES PATENTS

| | | |
|---|---|---|
| 2,326,140 | Gzemski | Aug. 10, 1943 |
| 2,601,219 | Morrill | June 17, 1952 |
| 2,679,508 | Gysin | May 25, 1954 |

OTHER REFERENCES

Fukuto et al.: "J. Am. Chem. Soc.," 76, 5103 (1954) (Oct. 20, 1954).

Kosolapoff: "Organo Phosphorus Compounds," Wiley & Sons (1950), pages 196, 235.